(No Model.)
E. T. BUTLER.
ROLLER MILL.
No. 281,237. Patented July 17, 1883.
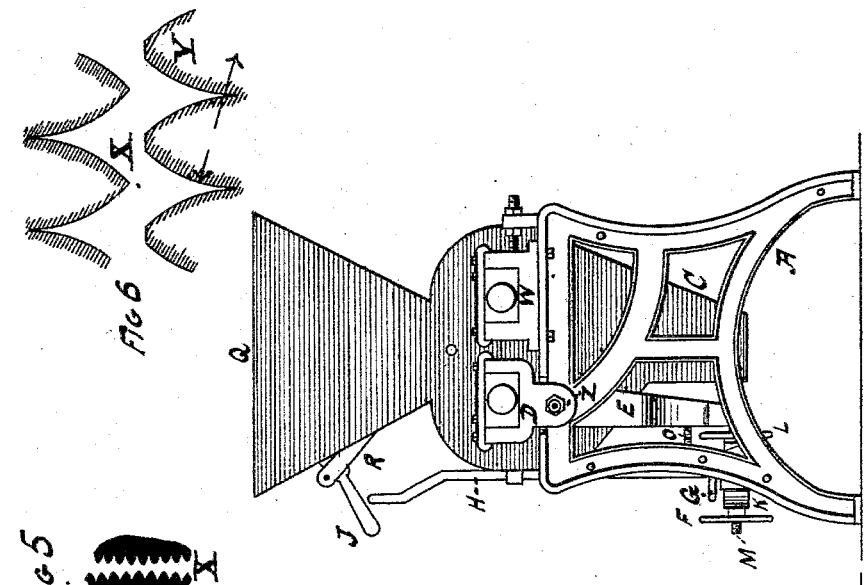
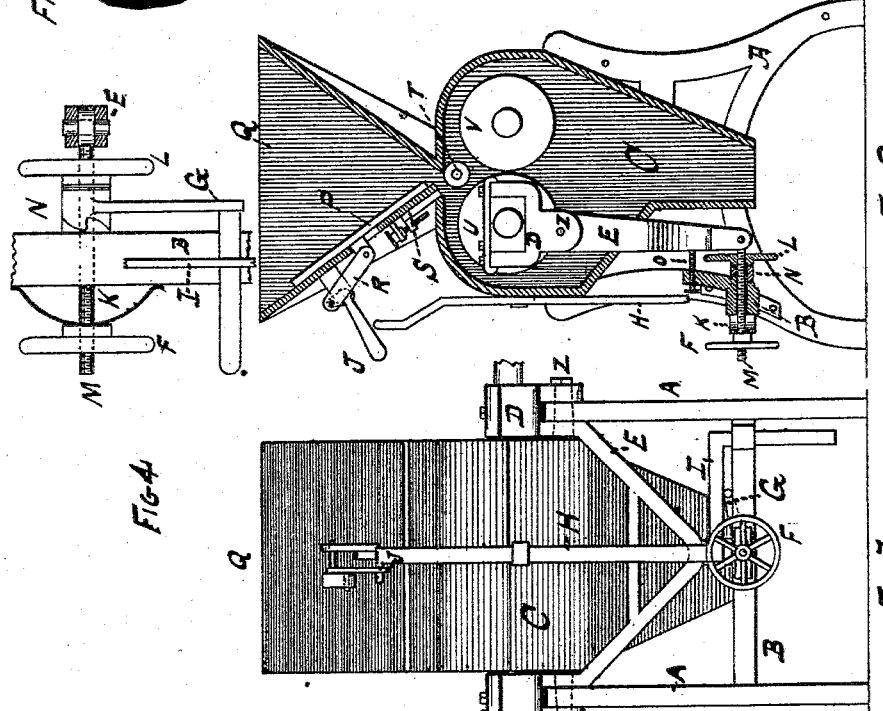
WITNESSES:
John Lorenz
John R. Bodds
INVENTOR
Eli T. Butler
by James N. See
ATTORNEY

UNITED STATES PATENT OFFICE.

ELI T. BUTLER, OF HAMILTON, OHIO.

ROLLER-MILL.

SPECIFICATION forming part of Letters Patent No. 281,237, dated July 17, 1883.

Application filed April 8, 1882. (No model.)

*To all whom it may concern:*

Be it known that I, ELI T. BUTLER, of Hamilton, Butler county, Ohio, have invented certain new and useful Improvements in Roller-Mills, of which the following is a specification.

This invention relates to devices for adjusting the movable roll in roller-mills, and to the arrangement of the grain-gate, as hereinafter set forth.

In the accompanying drawings, Figure 1 is a front view of a roller-mill embodying my improvements; Fig. 2, a vertical section of the same; Fig. 3, a side view of the same; Fig. 4, a plan of the adjusting device, and Figs. 5 and 6 sections of a suitable roll-dress.

In the drawings, A represents the side legs of the frame; B, a cross-bar uniting them in front; C, the casing of the rolls; W, boxes attached to the frame; V, a grinding-roll journaled in boxes W; E, a vertical lever pivoted at Z to the frame; D, roll-boxes formed in upper portion of the lever; U, a grinding-roll journaled in boxes D; M, a screw attached to lower end of lever E and reaching forward through a hole in cross-bar B; F, a hand-wheel on the screw outside of cross-bar; K, a spring interposed between hand-wheel F and cross-bar; G, a hand-lever whose hub is fitted to turn freely on screw M, on which it is located behind the cross-bar; N, spiral cam-faces formed on the rear of the cross-bar around the screw M, and also on the face of the hub of lever G, which engages the cross-bar; L, a hand-wheel fitted on screw M behind lever G; Q, the hopper of the mill; T, the feeding-roll; S, the gate for regulating the flow of grain from the hopper; P, a damper to prevent, when closed, the grain from reaching gate S; J, a bell-crank hand-lever pivoted to the hopper; R, a link connecting lever J with damper P; H, a sliding rod whose upper end lies just below lever J when damper P is open; I, a horizontal arm of rod H, lying just over lever G; X and Y, sections of conoidal teeth for roll-dress; O, a stop-screw in cross-bar, engaging lever E with its point.

In operation the spring K is set to proper strain by hand-wheel F. This determines the force with which the movable roll U is held to its work. Hand-wheel L is screwed toward the cross-bar till proper distance between the rolls is secured. This adjustment may be also made by means of stop-screw O, which can be set to secure the proper roll-opening; but I prefer to use the hand-wheel L as an adjusting device, and retain the screw O as a limiting-stop to prevent the rolls being adjusted into contact. Damper P is opened widely, and gate S set for proper feed by nice adjustment. If it be desired to stop the feed, the damper P is closed and the nice adjustment of the gate S left undisturbed. If the rolls are to be quickly opened, as when damaging matter seeks to pass them, the lever G is raised and the cam-faces act to strain the spring and open the rolls widely. Simultaneously the lever G lifts the rod H, and, acting on lever J, closes the damper P. When the rolls are reclosed, the damper remains closed, to be opened by hand when rolls are found to be in working condition.

The form of roll-dress incidentally set forth, and the means of supporting the adjustable roll U incidentally set forth, may form the subject of future applications for Letters Patent by me.

What I claim herein, and seek to secure by these Letters Patent, is—

1. In a roller-mill, an adjustable roll-carrier, a screw attached to the roll-carrier and protruded through a hole in some rigid portion of the mill-frame, a hand-wheel and spring on the protrusion of said screw, a hand-wheel on said screw, between the frame and roll-carrier, arranged to have an abutting action on the frame and serve in adjusting the position of the roll-carrier, and an independent stop to prevent contact of the rolls, all combined substantially as specified.

2. In a roller-mill, an adjustable roll-carrier, a screw attached to the roll-carrier and protruded through a hole in some rigid portion of the mill-frame, a hand-wheel and spring on the protrusion of said screw, means for adjusting the approach of the rolls, and a cam-faced lever pivoted on said screw between said frame and roll-carrier, and engaging a cam-face on the frame and an abutting-surface in its rear on said screw, all combined substantially as specified.

3. In a roller-mill, an adjustable roll-carrier, a screw attached to the roll-carrier and protruded through a hole in some rigid portion of the mill-frame, a hand-wheel and spring on the protrusion of said screw, a hand-wheel on said screw between the frame and roll-carrier, and a cam-faced lever pivoted on said screw between the frame and roll-carrier, and engaging a cam-face on the frame and abutting on said last-mentioned hand-wheel, all combined substantially as specified.

4. In a roller-mill, a quick roll-opening device, a grain gate or damper, a handle for operating said gate or damper, and a connection from said quick roll-opening device to said handle, adapted to operate said gate or damper when said quick roll-opening device is operated to open the rolls, and not to operate it when operated to close the rolls, all combined substantially as specified.

ELI T. BUTLER.

Witnesses:
JOHN LORENZ,
J. W. SEE.